United States Patent [19]
Kogowski

[11] Patent Number: 5,407,988
[45] Date of Patent: Apr. 18, 1995

[54] GRANITE-LOOK ACRYLONITRILE/STYRENE/ACRYLATE COPOLYMERS AND PROCESS FOR THEIR PREPARATION

[75] Inventor: Gary J. Kogowski, Farmington Hills, Mich.

[73] Assignee: BASF Corporation, Mount Olive, N.J.

[21] Appl. No.: 133,548

[22] Filed: Oct. 7, 1993

[51] Int. Cl.$^6$ .......................... C08K 7/00; C08K 3/22; C08K 5/04; C08L 55/00
[52] U.S. Cl. .................... 524/394; 524/413; 524/556; 524/565
[58] Field of Search .............. 524/394, 413, 556, 565; 428/364, 395, 401

[56] References Cited

U.S. PATENT DOCUMENTS

| | | | |
|---|---|---|---|
| 4,159,301 | 6/1979 | Buser et al. | 524/437 |
| 4,731,414 | 3/1988 | Ting | 525/71 |
| 4,959,401 | 9/1990 | Bellasalma et al. | 523/466 |
| 5,187,202 | 2/1993 | Walkowski | 524/35 |

OTHER PUBLICATIONS

Plastics Technology, Jul. 1993, p. 76, "Granite-Look Colorants".

*Primary Examiner*—James J. Seidleck
*Assistant Examiner*—Mark L. Warzel
*Attorney, Agent, or Firm*—Dennis V. Carmen

[57] ABSTRACT

Granite-looking acrylonitrile/styrene/acrylate copolymers are provided by incorporating into the copolymer a colorant mixture comprising colored polyester or nylon fibers, titanium dioxide, and a metal salt of an aliphatic carboxylic acid as a dispersant.

33 Claims, No Drawings

GRANITE-LOOK ACRYLONITRILE/STYRENE/ACRYLATE COPOLYMERS AND PROCESS FOR THEIR PREPARATION

FIELD OF THE INVENTION

The present invention pertains to acrylonitrile/styrene/acrylate copolymers (ASA) possessing a granite-like appearance. More particularly, the present invention pertains to compositions and processes suitable for preparing granite-look copolymers by extruding or injection molding ASA thermoplastic containing fibrous colorants which coalesce during processing to form granite-like specks in the finished product.

DESCRIPTION OF THE RELATED ART

Acrylonitrile/styrene/acrylate copolymers themselves are well known commercial thermoplastics. Such thermoplastics have many uses, for example, in bath tubs, shower stalls, and spas. These polymers are prepared by methods well known to those skilled in the art of vinyl polymerization. In the past, preparation of granite-look ASA polymers have required the addition of large diameter pigments or large agglomerations of smaller pigments. Since most commercial pigments are of very small size, preparation of large particle sizes or agglomerates is problematic at best and generally expensive.

An alternative to the use of large size pigments or pigment agglomerates is that one or more pigmented thermoplastics may be prepared and ground to the desired particle size. However, grinding of such pigmented thermoplastics generally requires expensive and time-consuming processes such as cryogrinding, due to the inherent ductility and elongation possessed by most thermoplastics.

SUMMARY OF THE INVENTION

It has now been unexpectedly discovered that granite-look ASA polymers may be simply and economically prepared by utilizing a colorant mixture containing chopped nylon or polyester fibers of the desired color, titanium dioxide, and a metallic soap dispersant. Although added to the ASA thermoplastic prior to extrusion or injection molding, no fibers may be detected in the final product, the fibers having coalesced during processing to form specks within the ASA thermoplastic matrix.

DESCRIPTION OF THE PREFERRED EMBODIMENTS

The ASA copolymers useful in the subject invention are prepared by polymerizing acrylonitrile, styrene, and an acrylate, for example, acrylic acid, methylacrylate, methacrylic acid, methylmethacrylate, or other esters of acrylic acid or methacrylic acid. Preferably, the copolymers contain from about 1 to about 50 weight percent acrylonitrile; about 1 to about 50 weight percent styrene; and from about 1 to about 10 weight percent acrylate. Suitable ASA polymers are available from BASF Corporation or BASF Aktiengesellschaft as LURAN-S® polymers.

The polyester and nylon fibers suitable for use in the process of the subject invention are available commercially. Such fibers are commonly used in preparing yarn for use in polyester and nylon carpeting. The fibers may contain pigment to provide the necessary coloration, or may contain a soluble dye, or may be colored after spinning, for example, solution dyeing. These methods of coloring polyesters and nylons are well known to those in the textile art.

The polyesters are generally aliphatic or aryl-aliphatic polyesters. The aliphatic polyesters are prepared by condensing an aliphatic or cycloaliphatic dicarboxylic acid with an aliphatic or cycloaliphatic glycol. Frequently, transesterification processes are used to prepare the polyester. In such cases, generally the dimethyl ester of the dicarboxylic acid is used. Anhydrides of the dicarboxylic acids may be used as well. Suitable diols are, for example, ethylene glycol, propylene glycol, 1,4-butanediol, 1,6-hexanediol, diethylene glycol, 1,4-dihydroxycyclohexane, and cyclohexanedimethanol. Suitable carboxylic acids are maleic acid, succinic acid, glutaric acid, azelaic acid, and most preferably, adipic acid. Mixtures of one or more diols and/or one or more dicarboxylic acids may be used.

The aryl-aliphatic polyesters contain one or more aryl dicarboxylic acids in full or partial substitution of the aliphatic dicarboxylic acids. For example, phthalic acid and terephthalic acid are commonly used aryl dicarboxylic acids. A highly suitable polyester is polyethyleneterephthalate (PET). Polybutylene terephthalate (PBT) is also useful.

The nylon fibers are preferably nylon 6, nylon 66, and nylon 610. Copolymer nylons are also useful. Any colorable nylons are suitable as the fiber in the colorant mixture.

The fibers may be used in a variety of lengths and diameters; but, in general, lengths of 3 mm or less are desirable. Diameters may be varied as well but should generally range from between 5 and 500 μm, preferably between 20 and 200 μm. In general, fibers having a larger internal volume will produce larger specks in the granite-look polymer.

The titanium dioxide utilized is standard pigment grade titanium dioxide. Pigment grade $TiO_2$ is available from many sources.

The metallic soap dispersant is a metal salt of an aliphatic carboxylic acid having 8 or more carbon atoms including the carboxylate carbon atom. Suitable metals are zinc, calcium, magnesium, lithium, sodium, potassium, aluminum, copper, iron, cobalt, nickel, titanium, and barium. Suitable carboxylic acids have 8 to about 30 branched or unbranched, saturated or olefinic carbon atoms, preferably from 8 to 22 carbon atoms, more preferably 8 to 22 saturated unbranched carbon atoms. Suitable carboxylic acids include stearic acid, oleic acid, linoleic acid, palmitic acid, lauric acid, octoic acid, and decanoic acid. Mixtures of the metal salts may be used. Particularly preferred is zinc stearate, calcium stearate, or a mixture thereof.

The colorant mixture comprises from 0.5 to 75 weight percent polyester and/or nylon fibers; from 0.5 to 75 weight percent titanium dioxide; and from 0.5 to 25 weight percent dispersing agent. More preferably, the colorant mixture comprises 10 to 60 weight percent fibers, 10 to 60 weight percent titanium dioxide, and 5 to 15 weight percent dispersant. Suitable colorant mixtures are available commercially, for example, Garal Colorants grades T and S, available from Calsak Corporation, Shaumburg, Ill. The colorant mixture is used in an amount of up to 50 weight percent of the granite-look polymer, preferably from 1 to about 10 weight percent.

The invention will now be illustrated by the following examples:

Dry blends of granulated LURAN-S® 98 parts 797 SE/UV natural ASA polymer and 2 parts Garal colorant (orange, light green, and black were utilized in distinct trials) were prepared. The dry blends were conditioned by drying at 80° C. for four (4) hours, following which they were injection molded from an Arburg twin screw extruder into a mold cavity having the dimensions of 4" diameter by ⅛" thick in the shape of discs. The first three zones of the extruder were maintained at 230° C., 250° C., and 260° C., respectively, with the injection nozzle at 260° C. The mold was maintained at 60° C. Following cooling of the part, plaques were removed and observed. All plaques had a granite-look or salt-and-pepper appearance, the dark species being the color of the pigment utilized. The specks were irregular in shape, but none resembled the fibers from which they were formed.

What is claimed is:

1. A composition suitable for the preparation of granite appearing acrylonitrile/styrene/acrylate copolymer articles, said composition comprising:
   a) a thermoplastic matrix copolymer comprising from about 50 to 99.5 weight percent of a thermoplastic acrylonitrile/styrene/acrylate copolymer; and
   b) from 0.5 to about 50 weight percent of a colorant mixture blended with said thermoplastic matrix copolymer, said colorant mixture comprising;
      bi) 0.5 to 75 weight percent colored fibers comprising nylon or polyester;
      bii) 0.5 to 75 weight percent titanium dioxide; and
      biii) 0.5 to 25 weight percent of a dispersant comprising one or more metallic salts of an aliphatic carboxylic acid having 8 or more carbon atoms.

2. The composition of claim 1, comprising from 1 to about 10 weight percent of a colorant mixture.

3. The composition of claim 2, wherein said colorant mixture comprises from 10 to 60 weight percent colored fibers, 10 to 60 weight percent titanium dioxide, and 5 to 15 weight percent of the dispersant.

4. The composition of claim 3, wherein the dispersant is a mixture of zinc stearate and calcium stearate.

5. The composition of claim 4, wherein the fiber is a polyester.

6. The composition of claim 5, wherein the fiber is a polyethyleneterephthalate.

7. The composition of claim 5, wherein the fiber is a polybutyleneterephthalate.

8. The composition of claim 4, wherein the fiber lengths are 3 mm or less and the fiber diameters are between 20 and 200 μm.

9. The composition of claim 1, wherein the dispersant is a metallic salt of an aliphatic carboxylic acid having 8 to 22 carbon atoms.

10. The composition of claim 9, wherein the aliphatic carboxylic acid is unbranched.

11. The composition of claim 10, wherein the aliphatic carboxylic acid is saturated.

12. The composition of claim 1, wherein the dispersant is zinc stearate.

13. The composition of claim 1, wherein the dispersant is calcium stearate.

14. The composition of claim 1, wherein the dispersant is a mixture of zinc stearate and calcium stearate.

15. The composition of claim 1, wherein the fibers are polyester fibers.

16. The composition of claim 1, wherein the fibers are nylon fibers.

17. A composition comprising:
   a) a thermoplastic matrix copolymer comprising an acrylonitrile/styrene/acrylate thermoplastic copolymer, and
   b) a colorant mixture blended with said thermoplastic matrix copolymer, wherein said colorant mixture comprises:
      bi) colored fibers comprising nylon or polyester;
      bii) titanium dioxide; and
      biii) metallic soap dispersant.

18. The composition of claim 17, wherein the copolymer contains from 1 to about 50 wt. % styrene, 1 to about 10 wt. % acrylate, and 1 to about 50 wt. % acrylonitrile.

19. The composition of claim 17, wherein the fibers are colored by solution dyeing.

20. The composition of claim 17, wherein the fiber comprises polybutyleneterephthalate or polyethyleneterephthalate.

21. The composition of claim 17, wherein the fiber comprises nylon 6, nylon 66, or nylon 610.

22. The composition of claim 17, wherein the fiber diameter is between 20 and 200 μm and has a length of less than 3 mm.

23. A granite appearing acrylonitrile/styrene/acrylate thermoplastic product comprising an acrylonitrile/styrene/acrylate thermoplastic matrix containing coalesced colored nylon or polyester fibers.

24. The product of claim 23, wherein the fibers are comprised of polybutyleneterephthalate or polyethyleneterephthalate.

25. The product of claim 23, wherein the fibers are comprised of nylon 6, nylon 66, or nylon 610.

26. The product of claim 23, wherein the fibers have a diameter between 20 and 200 μm and has a length of less than 3 mm.

27. A process for making a granite appearing acrylonitrile/styrene/acrylate thermoplastic product comprising blending a melt of an acrylonitrile/styrene/acrylate thermoplastic copolymer and a colorant mixture comprising nylon or polyester fibers for a time sufficient to allow said fibers to coalesce within said acrylonitrile/styrene/acrylate thermoplastic copolymer.

28. The process of claim 27, wherein said colorant mixture comprises colored nylon or polyester fibers, titanium dioxide, and a metallic soap dispersant.

29. The process of claim 27, wherein said fibers have a diameter between 20 and 200 μm.

30. The process of claim 27, wherein the acrylonitrile/styrene/acrylate comprises from 1 to about 50 wt. % styrene, 1 to about 10 wt. % acrylate, and 1 to about 50 wt. % acrylonitrile.

31. The process of claim 27, wherein the fibers are colored by solution dyeing.

32. The process of claim 27, wherein the fibers comprise polybutyleneterephthalate or polyethyleneterephthalate.

33. The process of claim 27, wherein the fibers comprise nylon 6, nylon 66, or nylon 610.

* * * * *